United States Patent [19]

Boesch et al.

[11] 3,846,440
[45] *Nov. 5, 1974

[54] PROCESS FOR THE PREPARATION OF 3-PHENYL-5-T-BUTYL-2-OXADIAZOLONES

[76] Inventors: Roger Boesch, Vitry sur Seine; Andre Blind, Villeurbanne; Jean-Marie Cassal, Saint-Louis, all of France

[ * ] Notice: The portion of the term of this patent subsequent to Nov. 5, 1991, has been disclaimed.

[22] Filed: Aug. 5, 1970

[21] Appl. No.: 61,487

[30] Foreign Application Priority Data
Aug. 7, 1969  France .............................. 69.27227

[52] U.S. Cl............................................. 260/307 A
[51] Int. Cl............................................. C07d 85/54
[58] Field of Search .............................. 260/307 A

[56] References Cited
UNITED STATES PATENTS
3,129,222   4/1964   Bicking .............................. 260/240

OTHER PUBLICATIONS

Wagner et al. "Synthetic Organic Chemistry" John Wiley & Sons, Inc., 1953, page 572.
Morrison et al. "Organic Chemistry" Allyn & Bacon, Inc., 1959, pages 392, 525–526, 570–571.
Parker, A. J. Advances in Organic Chemistry—Methods and Results" Volume 5, (1965), pp. 9–10; Interscience Publishers.

Primary Examiner—Raymond V. Rush
Attorney, Agent, or Firm—Stevens, Davis, Miller & Mosher

[57] ABSTRACT 3-(2,4-Dichlorophenyl)-5-t-butyl-1,3,4-oxadiazol-2-ones of the formula:

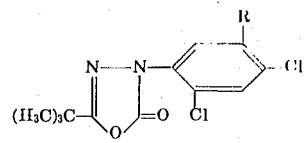

in which R represents a hydrogen atom or an alkoxy group containing one to four carbon atoms, which possess herbicidal properties, are prepared by a new process involving reaction of a halogenonitrobenzene of the formula:

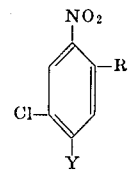

in which Y represents a halogen atom and R is as defined, with an alkali metal salt of 5-t-butyl-1,3,4-oxadiazol-2-one, reduction of the nitro group in the resulting 3-(2-chloro-4-nitrophenyl)-5-t-butyl-1,3,4-oxadiazol-2-one, which may carry an alkoxy substituent R in the 5-position of the benzene ring, to a primary amino group, and replacement of the amino group in the resulting 3-(2-chloro-4-aminophenyl)-5-t-butyl-1,3,4-oxadiazol-2-one by a chlorine atom by reaction of cuprous chloride with a diazonium salt derived from the amino compound. The process avoids the use of phosgene — an awkward reagent hitherto employed in the production of the 3-(2,4-dichlorophenyl)-5-t-butyl-1,3,4-oxadiazol-2-ones.

9 Claims, No Drawings

PROCESS FOR THE PREPARATION OF 3-PHENYL-5-T-BUTYL-2-OXADIAZOLONES

This invention relates to a new process for the preparation of 3-phenyl-5-t-butyl-2-oxadiazolones.

In the specification of U.S. Pat. No. 3,385,862 granted on May 28, 1968 to J. Metivier and R. Boesch it is disclosed that 3-phenyl-5-t-butyl-2-oxadiazolones of the formula:

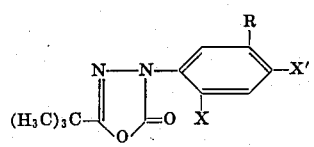
I in which X and X' each represent a halogen atom, and R represents a hydrogen atom or an alkoxy group containing one to four carbon atoms, possess herbicidal properties and are useful for combatting graminaceous and dicotyledonous weeds, for example Panicum, crabgrass, foxtail, pigweed, mayweed and dandelion, in crops such as rice, carrot, cabbage, pea, broad bean and maize. The aforesaid specification describes a process for the preparation of the oxadiazolone compounds which involves the reaction of phosgene with a hydrazide of the formula:

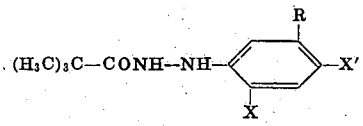
II in which X, X' and R are as hereinbefore defined.

It has now unexpectedly been found that a preferred class of oxadiazolones within the scope of the invention claimed in U.S. Pat. No. 3,385,862, which are the 3-(2,4-dichlorophenyl)-5-t-butyl-2-oxadiazolones of the formula:

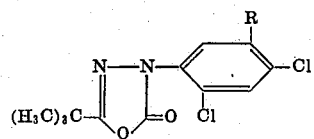
III in which R is as hereinbefore defined, can be prepared by a new process, the object of which is to avoid the use of phosgene—a dangerous toxic substance which can only be employed on an industrial scale provided special installations are utilised and very strict safety measures are applied.

The new process of the present invention for the preparation of the oxadiazolone derivatives of formula III comprises reacting a halogenonitrobenzene of the formula:

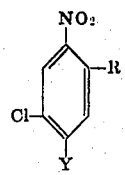
IV in which Y represents a halogen (preferably chlorine) atom and R is as hereinbefore defined, with an alkali metal salt of 5-t-butyl-1,3,4-oxadiazol-2-one of the formula:

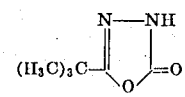
V reducing the nitro group in the resulting product of the formula:

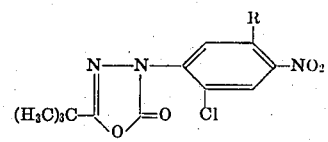
VI in which R is as hereinbefore defined, to a primary amino group by methods known per se and which do not effect the rest of the molecule, converting by methods known per se the amino group in the oxadiazolone derivative thus obtained of the formula:

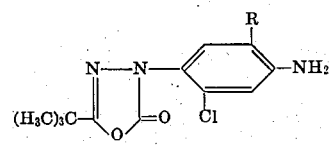
VII in which R is as hereinbefore defined, into a diazonium salt grouping, and reacting the resulting diazonium compound with cuprous chloride to form a 3-(2,4-dichlorophenyl)-5-t-butyl-2-oxadiazolone of formula III. By the term "methods known per se" as used in this specification is meant methods heretofore used or described in the chemical literature.

The reaction of the halogenonitrobenzene of formula IV with an alkali metal salt (preferably the potassium salt) of 5-t-butyl-1,3,4-oxadiazol-2-one is preferably carried out in an aprotic solvent, such as dimethylformamide, dimethylacetamide, hexamethylphosphotriamide, dimethylsulphoxide or N-methylpyrrolid-2-one, at a temperature between 50° and 200° C. The alkali metal salt of the oxadiazolone reactant may be prepared in situ.

The nitro group in the intermediate products of formula VI is preferably reduced to a primary amino group by means of iron in a dilute acid (e.g. hydrochloric acid) medium. Reduction of the nitro group can also be effected by catalytic hydrogenation using Raney nickel, or palladium on charcoal, as catalyst.

Conversion of the primary amino group in the oxadiazolone intermediates of formula VII into a diazonium salt grouping can be effected by treatment of the oxadiazolones with an alkali metal nitrite in an acid (e.g. hydrochloric acid) medium at a temperature below 5° C.

The diazonium compounds derived from the oxadiazolones of formula VII are preferably treated with freshly prepared cuprous chloride to replace the diazonium group by chlorine.

The halogenonitrobenzene starting materials of formula IV in which R represents an alkoxy radical containing one to four carbon atoms can be prepared by reaction of an alkali metal alkoxide in an alcoholic medium, optionally in the presence of an alkali metal iodide such as sodium iodide, or by reaction of an alcohol in the presence of an alkali metal hydroxide in a dilute medium, with a benzene compound of the formula:

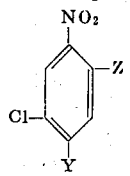

VIII in which Y and Z represent halogen atoms, preferably chlorine atoms. This reaction, the yields of which are improved in the absence of water, generally gives a mixture of isomeric products of formula IV and of the formula:

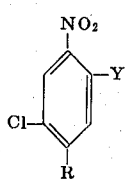

IX in which R and Y are as hereinbefore defined. The isomer of formula IV can be obtained from the reaction mixture by crystallisation.

The isomer of formula IV can also be obtained by the method indicated above but using, in place of the compound of formula VIII as above defined, a compound of the same formula but in which Y represents a nitro group and Z represents a chlorine atom.

5-t-Butyl-1,3,4-oxadiazol-2-one of formula V can be obtained by reaction of potassium hypobromite in an alkaline medium with trimethylacetylurea.

Alkali metal salts of the oxadiazolone of formula V can be obtained either by reaction of the oxadiazolone with an alkali metal alkoxide, e.g. potassium ethoxide, in alcoholic solution, or in situ, by the action of an alkali metal carbonate, e.g. potassium carbonate, in an organic solvent such as N-methylpyrrolid-2-one.

The process according to the invention enables 3-(2,4-dichlorophenyl)-5-t-butyl-2-oxadiazolones of formula III to be obtained in good yields and from easily accessible starting materials.

The following Examples illustrate the process of the present invention.

EXAMPLE 1 a. 2-Isopropoxy-4,5-dichloro-nitrobenzene (25 g.) and the potassium salt of 5-t-butyl-1,3,4-oxadiazol-2-one (18 g.) and N-methylpyrrolid-2-one (150 cc.) are heated, with stirring, at 110° C. for 3 hours. After cooling the reaction mixture, the potassium chloride precipitate is filtered off and the filtrate is poured into water (600 cc.). The precipitate which appears is filtered off and then dissolved in diethyl ether (750 cc.). The resulting solution is washed with water (250 cc.), dried over sodium sulphate and then concentrated to dryness under reduced pressure (20 mm. Hg) at 40° C. After recrystallisation of the residue from ethanol (155 cc.), 3-(2-chloro-4-nitro-5-isopropoxy-phenyl)-5-t-butyl-1,3,4-oxadiazol-2-one (11.3 g.), melting at 124°–125° C., is obtained.

$b_1$. 98 percent Pure iron powder (17.1 g.) is added gradually over the course of 7 minutes, with stirring, to a mixture of 3-(2-chloro-4-nitro-5-isopropoxy-phenyl)-5-t-butyl-1,3,4-oxadiazol-2-one (35.5 g.), ethanol (80 cc.), water (20 cc.) and concentrated hydrochloric acid ($d = 1.18$; 0.5 cc.) heated to a temperature close to the boiling point of the mixture. The reaction mixture is thereafter kept under reflux for 3 hours, then cooled to about 20° C. and neutralised by adding solid potassium bicarbonate (0.66 g.). The aqueous-alcoholic solution obtained after filtration is concentrated under reduced pressure (20 mm.Hg). The residue is taken up in methylene chloride (100 cc.) and water (50 cc.). The organic phase is separated, dried over sodium sulphate and then concentrated to dryness under reduced pressure (20 mm.Hg) at 50° C. After recrystallisation of the residue from cyclohexane (340 cc.), 3-(2-chloro-4-amino-5-isopropoxy-phenyl)-5-t-butyl-1,3,4-oxadiazol-2-one (30 g.) is obtained; this product exists in two different crystalline forms, one melting at about 95° C. and the other melting at about 107° C.

$b_2$. Reduction of the same nitro compound can also be carried out as follows:

3-(2-Chloro-4-nitro-5-isopropoxy-phenyl)-5-t-butyl-1,3,4-oxadiazol-2-one (3 g.), palladium on charcoal 2 S (10 percent) (300 mg.) and ethyl acetate (50 cc.) are stirred in a 125 cc. autoclave for 1½ hours at 25° C. under a pressure of 20 bars of hydrogen. The catalyst is filtered off and the yellow solution is concentrated to dryness under reduced pressure. After recrystallisation of the residue from cyclohexane (20 cc.), 3-(2-chloro-4-amino-5-isopropoxy-phenyl)-5-t-butyl-1,3,4-oxadiazol-2-one (2.66 g.), m.p. 95° C., is obtained.

c. A solution of sodium nitrite (4 g.) in water (8 cc.) is added over the course of 5 minutes, with stirring, to a suspension of 3-(2-chloro-4-amino-5-isopropoxy-phenyl)-5-t-butyl-1,3,4-oxadiazol-2-one (18 g.) in 8N hydrochloric acid (43 cc.) maintained at between 0° and 5° C. After stirring for 1 hour at 0° C., the solution of diazonium salt is filtered and then added, over the course of about 30 minutes, to a solution of cuprous chloride in hydrochloric acid maintained at between 0° and 5° C.

[The solution of cuprous chloride in hydrochloric acid is prepared as follows:

Sodium chloride (4.5 g.) and copper sulphate (17.3 g.) are dissolved in water (55.3 cc.) (solution A).

An alkaline sodium sulphite solution is prepared from sodium hydroxide solution ($d = 1.33$; 6 cc.), sodium bisulphite solution ($d = 1.24$; 9.75 cc.) and water (14.4 cc.) (solution B).

Solution B is poured into solution A. The cuprous chloride is filtered off, washed with water and then dissolved in a solution of hydrochloric acid ($d = 1.18$; 28 cc.) in water (28 cc.).]

Thereafter the temperature of the reaction mixture is allowed to return to 20° C. When the evolution of nitrogen has ceased, the precipitate which appears is filtered off, washed with water and dried under reduced pressure (0.5 mm.Hg) at 20° C. After recrystallisation from ethanol (16.5 cc.), 3-(2,4-dichloro-5-isopropoxy-phenyl)-5-t-butyl-1,3,4-oxadiazol-2-one (13 g.), melting at 88°–89° C., is obtained.

2-Isopropoxy-4,5-dichloro-nitrobenzene used as starting material can be prepared as follows:

Sodium iodide (22.5 g.) is added to the solution of sodium isopropoxide in isopropanol obtained by reaction of sodium (34.5 g.) with isopropanol (3 litres) under reflux, and the mixture is then cooled to about 40° C. Whilst keeping the mixture at this temperature, 2,4,5-trichloro-nitrobenzene (339.6 g.) is added, with stirring, over the course of 2 hours. When the addition is complete, sodium iodide (22.5 g.) is again added and stirring is continued for 2 hours at 40° C. After cooling to −5° C., the precipitate which appears is filtered off, washed with water (1.5 litres) and dried under reduced pressure (0.5 mm.Hg) at 20° C. 2-Isopropoxy-4,5-dichloro-nitrobenzene (237 g.), melting at 94°–95° C., is thus obtained.

2,4,5-Trichloro-nitrobenzene, m.p. 59°C., can be obtained by direct nitration of 1,2,4-trichlorobenzene.

The initial potassium salt of 5-t-butyl-1,3,4-oxadiazol-2-one can be obtained by reaction of potassium ethoxide in ethanol solution with 5-t-butyl-1,3,4-oxadiazol-2-one (boiling point 84°–86° C.; 0.1 mm.Hg), which can itself be prepared by the action of potassium hydrobromite on trimethylacetylurea (m.p. 150° C.) in an alkaline medium.

EXAMPLE 2

$a_1$. A mixture of 2-isopropoxy-4,5-dichloro-nitrobenzene (50g.), 5-t-butyl-1,3,4-oxadiazol-2-one (28.4 g.) and potassium carbonate (27.6 g.) in N-methylpyrrolid-2-one (300 cc.) is heated, with stirring, at 110° C. for 3 hours. The reaction mixture is then treated as indicated in Example 1 under (a). 3-(2-Chloro-4-nitro-5-isopropoxy-phenyl)-5-t-butyl-1,3,4-oxadiazol-2-one (22 g.), melting at 123°–124° C., is thus obtained.

$a_2$. 2-Isopropoxy-4,5-dichloro-nitrobenzene (6.2 g.) and the potassium salt of 5-t-butyl-1,3,4-oxadiazol-2-one (4.48 g.) and dimethylsulphoxide (37.5 cc.) are heated at 140° C. for 1 hour 10 minutes. The temperature rise of the reaction mixture is effected rapidly, namely in 10 minutes. After cooling the reaction mixture, the potassium chloride precipitate is filtered off and the filtrate poured into water (150 cc.) with vigorous stirring. The precipitate which appears is filtered off and dried. It is then crystallised by cooling a hot solution of it in an 80/20 ethanol-water mixture (50 cc.), and washed with a cold 80/20 ethanol-water mixture (20 cc.). After drying in a good vacuum, 3-(2-chloro-4-nitro-5-isopropoxy-phenyl)-5-t-butyl-1,3,4-oxadiazol-2-one (5.3 g.), melting at 125° C., is recovered.

When treated as indicated in Example 1 under ($b_1$), or ($b_2$), and (c), the products obtained give 3-(2,4-dichloro-5-isopropoxy-phenyl)-5-t-butyl-1,3,4-oxadiazol-2-one comparable to that of Example 1(c).

EXAMPLE 3 a. A mixture of 3,4-dichloro-nitrobenzene (192 g.), the potassium salt of 5-t-butyl-1,3,4-oxadiazol-2-one (180 g.) and N-methylpyrrolid-2-one (1,500 cc.) is heated, with stirring, at 110° C. for 3 hours. After cooling the potassium chloride precipitate is filtered off and the filtrate is added to water (8 litres). The product which precipitates is filtered off, washed with water (2 × 500 cc.) and then dissolved in benzene (2,000 cc.). The benzene solution is washed with water (3 × 500 cc.), dried over sodium sulphate and then concentrated under reduced pressure (20 mm.Hg) at 45° C. After recrystallisation of the residue from ethanol (434 cc.), 3-(2-chloro-4-nitrophenyl)-5-t-butyl-1,3,4-oxadiazol-2-one (171.5 g.), melting at 102° C., is obtained.

b. 98 percent Pure iron powder (98.5 g.) is added gradually over the course of 55 minutes to a mixture of 3-(2-chloro-4-nitrophenyl)-5-t-butyl-1,3,4-oxadiazol-2-one (171 g.), ethanol (230 cc.), water (57.5 cc.) and concentrated hydrochloric acid ($d = 1.18$; 2.85 cc.) heated under reflux. The reaction mixture is thereafter kept under reflux for 2 hours 5 minutes and then neutralised by adding solid potassium bicarbonate (38 g.). After cooling, the insoluble material is filtered off and extracted three times with chloroform (total 800 cc.). The combined chloroform extracts are washed with water (300 cc.), dried over sodium sulphate, and then concentrated to dryness under reduced pressure (20 mm.Hg) at 50° C. After recrystallisation of the residue from benzene (567 cc., and then 486 cc.), 3-(2-chloro-4-aminophenyl)-5-t-butyl-1,3,4-oxadiazol-2-one (105 g.), melting at 163° C., is obtained.

c. A solution of sodium nitrite (7.24 g.) in water (14.5 cc.) is added over the course of 20 minutes to a suspension of 3-(2-chloro-4-aminophenyl)-5-t-butyl-1,3,4-oxadiazol-2-one (26.8 g.) in 8N hydrochloric acid (200 cc.) maintained at between 0° and 5°C. After stirring for 1 hour at 0° C., the diazonium salt solution is filtered and is then added over the course of 30 minutes at between 0° and 5° C. to a solution of cuprous chloride in hydrochloric acid. [The solution of cuprous chloride in hydrochloric acid is prepared as described in Example 1 using the following quantities:

| solution A : | sodium chloride | : 8.2 g. |
| | copper sulphate | : 31.3 g. |
| | water | : 100 cc. |
| solution B : | sodium hydroxide solution ($d = 1.33$) | : 10.9 cc. |
| | sodium bisulphite solution ($d = 1.24$) | : 17.6 cc. |
| | water | : 26 cc. |

The cuprous chloride precipitate is taken up in a solution of hydrochloric acid ($d = 1.18$; 25 cc.) in water (25 cc.)].

Thereafter the temperature of the reaction mixture is allowed to return to 20° C. When the evolution of nitrogen has ceased, the precipitate which appears is filtered off, washed with water (4 × 25 cc.) and dried under reduced pressure (0.5 mm.Hg) at 20° C. After recrystallisation from petroleum ether (boiling point 40°–60° C.; 25 cc.) 3-(2,4-dichlorophenyl)-5-t-butyl-1,3,4-oxadiazol-2-one (18.25 g.), melting at 64° C., is obtained.

3,4-Dichloro-nitrobenzene, m.p. 43°C., used as starting material can be obtained by direct nitration of o-dichlorobenzene.

We claim:

1. Process for the preparation of 3-(2,4-dichlorophenyl)-5-t-butyl-1,3,4-oxadiazol-2-ones of the formula:

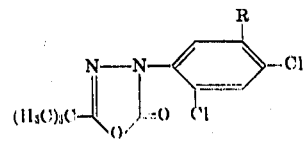

in which R represents hydrogen or alkoxy of one to four carbon atoms, which comprises reacting a halogenonitrobenzene of the formula:

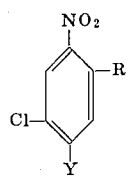

in which Y represents halogen and R is as hereinbefore defined, with an alkali metal salt of 5-t-butyl-1,3,4-oxadiazol-2-one in an aprotic solvent selected from the group consisting of dimethylformamide, dimethylacetamide, hexamethylphosphotriamide, dimethylsulphoxide and N-methyl pyrrolid-2-one, reducing the nitro group in the resulting product of the formula:

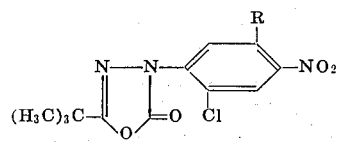

in which R is as hereinbefore defined, to a primary amino group, diazotizing the amino group in the oxadiazolone derivative thus obtained of the formula:

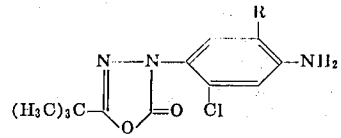

in which R is as hereinbefore defined, and reacting the resulting diazonium compound with cuprous chloride to replace the diazonium grouping by a chlorine atom.

2. Process according to claim 1 in which Y represents a chlorine atom.

3. Process according to claim 1 in which the potassium salt of 5-t-butyl-1,3,4-oxadiazol-2-one is reacted with the halogenonitrobenzene.

4. Process according to claim 1 in which the reaction between the halogenonitrobenzene and alkali metal salt of 5-t-butyl-1,3,4-oxadiazol-2-one is carried out at a temperature between 50° and 200° C.

5. Process according to claim 1 in which the nitro group of the 3-(2-chloro-4-nitrophenyl)-5-t-butyl-1,3,4-oxadiazol-2-one intermediate is reduced to primary amino by means selected from iron in a dilute acid medium and catalytic hydrogenation.

6. Process according to claim 1 in which the amino group of the 3-(chloro-4-aminophenyl)5-t-butyl-1,3,4-oxadiazol-2-one intermediate is diazotized by treatment with an alkali metal nitrite in an acid medium at a temperature below 5° C.

7. Process according to claim 1 for the preparation of 3-(2,4-dichloro-phenyl)-5-t-butyl-1,3,4-oxadiazol-2-ones of the formula:

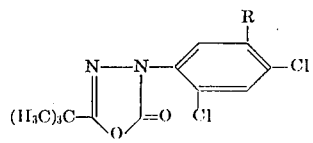

in which R represents hydrogen or alkoxy of one to four carbon atoms, which comprises reacting a halogenonitrobenzene of the formula:

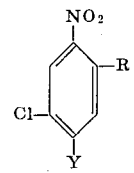

in which Y represents halogen and R is as hereinbefore defined, with an alkali metal salt of 5-t-butyl-1,3,4-oxadiazol-2-one in an aprotic solvent medium at a temperature between 50° and 200° C., reducing the nitro group in the resulting product of the formula:

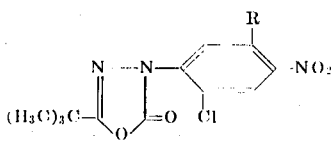

in which R is as hereinbefore defined, to a primary amino group by means selected from iron in a dilute acid medium and catalytic hydrogenation, diazotizing the amino group in the oxadiazolone derivative thus obtained of the formula:

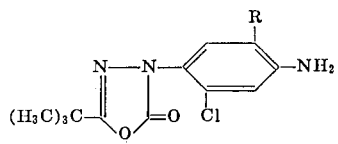

in which R is as hereinbefore defined, by treatment with an alkali metal nitrite in an acid medium at a temperature below 5° C., and reacting the resulting diazonium compound with cuprous chloride to replace the diazonium grouping by a chloring atom.

8. Process according to claim 7 in which Y is chlorine.

9. Process according to claim 7 in which the potassium salt of 5-t-butyl-1,3,4-oxadiazol-2-one is reacted with the halogenonitrobenzene.

* * * * *